United States Patent
Katkov et al.

(10) Patent No.: US 10,819,648 B2
(45) Date of Patent: Oct. 27, 2020

(54) RETRY HANDLING IN MESSAGING QUEUES

(71) Applicant: ATLASSIAN PTY LTD, Sydney (AU)

(72) Inventors: Igor Katkov, San Jose, CA (US); Alex Kudinov, San Mateo, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 516 days.

(21) Appl. No.: 15/634,958

(22) Filed: Jun. 27, 2017

(65) Prior Publication Data

US 2018/0375783 A1    Dec. 27, 2018

(51) Int. Cl.
*H04L 12/863* (2013.01)
*H04L 12/24* (2006.01)
*H04L 12/875* (2013.01)

(52) U.S. Cl.
CPC .......... *H04L 47/626* (2013.01); *H04L 41/069* (2013.01); *H04L 47/56* (2013.01); *H04L 47/621* (2013.01); *H04L 47/6245* (2013.01)

(58) Field of Classification Search
CPC . H04L 47/626; H04L 41/069; H04L 47/6245; H04L 47/621; H04L 47/56
See application file for complete search history.

(56) References Cited

U.S. PATENT DOCUMENTS

| | | | |
|---|---|---|---|
| 7,673,302 B1* | 3/2010 | Katzer | G06F 9/5038 710/39 |
| 9,489,322 B2* | 11/2016 | Wagh | G06F 13/1631 |
| 10,382,380 B1* | 8/2019 | Suzani | H04L 47/125 |
| 2003/0028580 A1* | 2/2003 | Kucherawy | H04L 51/14 718/101 |
| 2003/0088721 A1* | 5/2003 | Sharma | G06F 13/4036 710/112 |
| 2004/0205136 A1* | 10/2004 | Whittenberger | G06Q 10/10 709/206 |
| 2009/0197622 A1* | 8/2009 | Atarius | H04L 51/30 455/466 |

(Continued)

*Primary Examiner* — Ario Etienne
*Assistant Examiner* — Kidest Mendaye
(74) *Attorney, Agent, or Firm* — Brownstein Hyatt Farber Schreck, LLP

(57) ABSTRACT

In one embodiment, a computer-implemented method comprises receiving a plurality of digital data messages in a first-in first-out (FIFO) primary queue of an electronic digital memory that is coupled to a message consuming process that is executed using computer instructions that are programmed to serially obtain messages from the primary queue and to process the messages; determining that processing a first message of the plurality of messages has failed; in response to determining that processing the first message failed, using the message consuming process, sending a first acknowledgement to the primary queue, sending the first message to a retry queue that is different from the primary queue, and processing one or more other messages from the primary queue; obtaining the first message from the retry queue; reprocessing the first message; repeating periodically selecting and processing one or more other messages from the primary queue and periodically selecting and processing one or more different other messages from the retry queue.

20 Claims, 4 Drawing Sheets

(56) References Cited

U.S. PATENT DOCUMENTS

| | | | |
|---|---|---|---|
| 2010/0013625 A1* | 1/2010 | Kouzan | H04M 11/04 340/508 |
| 2010/0298014 A1* | 11/2010 | Kamphuis | H04L 51/38 455/466 |
| 2013/0080542 A1* | 3/2013 | Peng | H04L 69/08 709/206 |
| 2015/0381511 A1* | 12/2015 | Word | H04L 47/50 709/223 |

* cited by examiner

RETRY HANDLING IN MESSAGING QUEUES

FIELD OF THE DISCLOSURE

The technical field of the present disclosure generally relates to improved methods, computer software, and/or computer hardware in the field of computer messaging. More specifically, the present disclosure relates to computer-implemented techniques for retry handling in messaging queues.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer systems have grown increasingly complex over the years. Modern applications can expect to be deployed and used across many different computer systems. These computer systems may have different operating systems (and different versions of the same operating system), different networks or network protocols, and different hardware or types of computing devices. Further, these computing systems may be located anywhere in the world. However, these applications and computing systems still expect, and need, to be able to easily communicate with other computing systems, applications, and software components. This has given rise to message oriented middleware or message bus systems.

Message oriented middleware is software or hardware that provides a layer that allows software applications or components that have been developed independently or execute on a different platforms to easily communicate. By providing this middle layer, software applications or components need only be concerned about communicating with the middle layer—no concern is needed about how an intended recipient of a message will receive the message. Message oriented middleware may be accessed by a software application through an application programming interface, or other suitable methods.

Software as a Service (SaaS) is a software licensing and delivery model in which software is centrally hosted in the cloud, and typically accessed by client devices via the Internet or other communication channel. Many different types of applications and software components are now hosted in the cloud, including message oriented middleware. Many vendors provide message oriented middleware via the cloud, typically referred to as message queueing services. Message queueing services come with advantages and disadvantages to the clients that use these services. Improvements are needed to reduce the disadvantages and improve the efficiency of using message queueing services.

DETAILED DESCRIPTION

Figure 1:
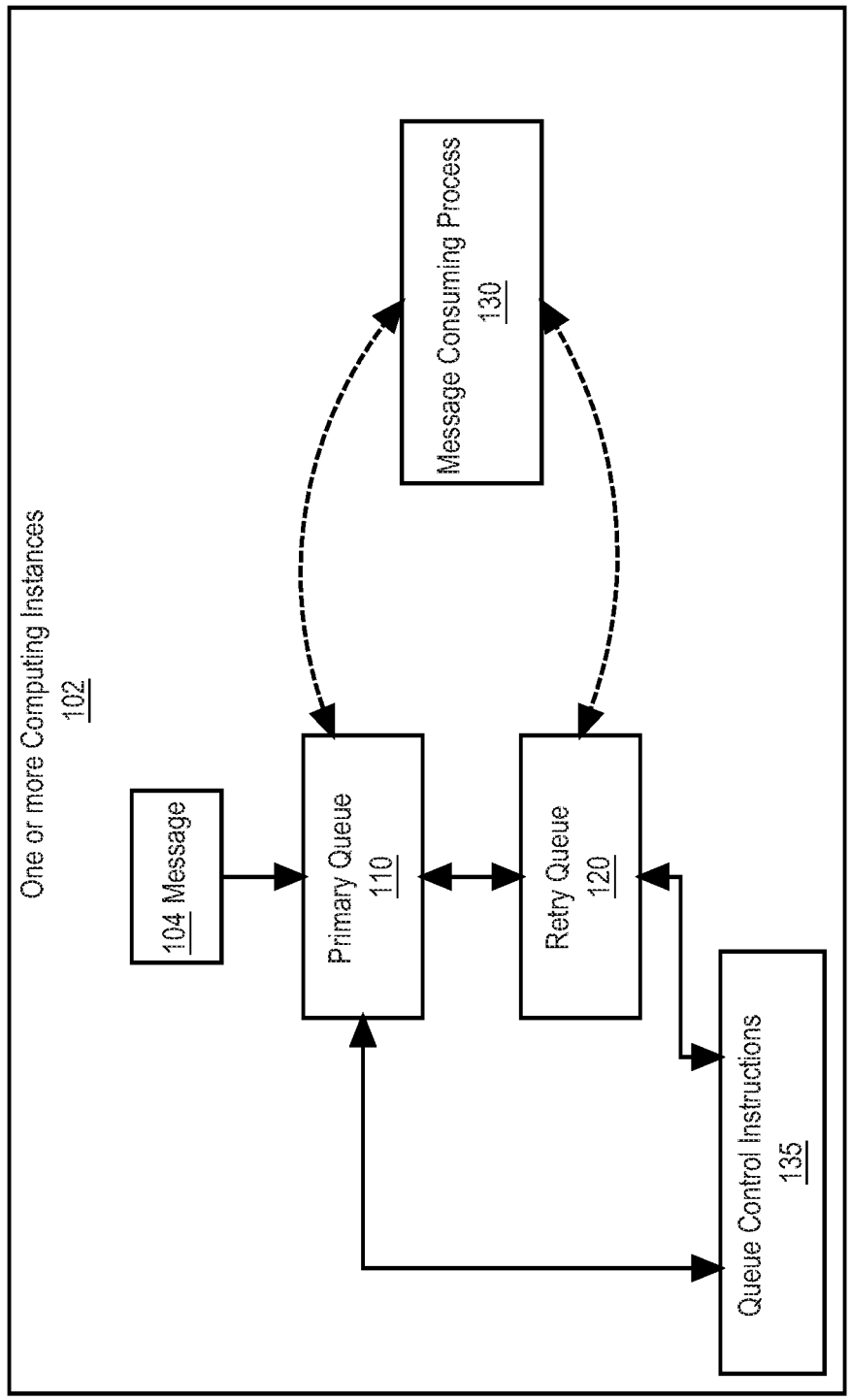
FIG. 1 illustrates an example computer system in which the techniques described herein may be practiced, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:

1. OVERVIEW
2. EXAMPLE COMPUTER SYSTEM IMPLEMENTATION
3. EXAMPLE FUNCTIONAL IMPLEMENTATION
4. EXAMPLE RETRY HANDLING IN MESSAGING QUEUES
5. HARDWARE OVERVIEW

1. Overview

Computer-implemented techniques are provided for retry handling in messaging queues. In various embodiments, digital data messages are communicated using a messaging service. The messaging service provides a first-in first-out (FIFO) queue for communication between different components, applications, computing instances, computing devices, etc. Any type of messages and data may be communicated through the FIFO queue, from any suitable source to any suitable recipient. In consuming messages, a computing instance may utilize two FIFO queues: a primary queue and a retry queue. The primary queue and the retry queue may be provided by the same or different messaging service(s). The primary queue is the primary queue used for communication. The retry queue is utilized when processing a message from the primary queue has failed.

When a computing device receives a message from the primary queue, the computing device processes the message. If processing is successful, an acknowledgement is sent to the primary queue indicating the successful receipt and processing of the message. Typically, the primary queue sends another message in response to the acknowledgement, assuming there are more messages in the primary queue. However, if processing is unsuccessful, the computing device still sends an acknowledgement to the primary queue indicating the successful receipt or processing, and subsequently forwards or otherwise sends the message that was unable to be processed to the retry queue. Thus, the primary queue may continue to send messages, and the computing instance may continue to consume messages from the primary queue, without getting stuck on a particular message. After a period of time, the retry queue will send the earlier message back to the computing device. If reprocessing is successful, an acknowledgement is sent to the retry queue indicating the successful receipt and reprocessing of the message. If reprocessing is not successful, an acknowledgement is still sent to the retry queue indicating the successful receipt and reprocessing of the message, and subsequently forwards or otherwise sends the message that was unable to be processed back to the retry queue.

This method allows the primary queue to send messages as fast as a message consuming process can receive and process the messages, without unintended slowdowns from failed processing or receipt. This results in a more efficient usage of the message queue service(s) and message consuming process, resulting in gains in processing time and a reduction in memory usage.

In one embodiment, a computer-implemented method comprises receiving a plurality of digital data messages in a FIFO primary queue of an electronic digital memory that is coupled to a message consuming process that is executed using computer instructions that are programmed to serially obtain messages from the primary queue and to process the messages, determining that processing a first message of the plurality of messages has failed, in response to determining that processing the first message failed, using the message consuming process, sending a first acknowledgement to the primary queue, sending the first message to a retry queue that is different from the primary queue, and processing one or more other messages from the primary queue, obtaining the first message from the retry queue, reprocessing the first message, repeating periodically selecting and processing one or more other messages from the primary queue and periodically selecting and processing one or more different other messages from the retry queue.

Other embodiments, aspects and features will become apparent from the disclosure as a whole.

2. Example Computer System Implementation

FIG. 1 illustrates a system in which the techniques described may be practiced, according to one embodiment.

FIG. 1 illustrates one or more computing instances 102, message 104, primary queue 110, retry queue 120, message consuming process 130, and queue control instructions 135. In an embodiment, one or more computing instances 102 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

One or more computing instances 102 may execute on any computing device, including but not limited to: servers, racks, work stations, personal computers, general purpose computers, laptops, Internet appliances, wireless devices, wired devices, multi-processor systems, mini-computers, and the like. Although FIG. 1 shows one or more computing instances 102 as a single element, one or more computing instances 102 broadly represents one or multiple computing devices, and may be located in one or more physical locations. One or more computing instances 102 also may represent one or more virtual computing instances that execute using one or more computers in a datacenter such as a virtual server farm. One or more computing instances 102 may be connected through any kind of computer network using any combination of wired and wireless communication, including, but not limited to: a Local Area Network (LAN), a Wide Area Network (WAN), one or more internetworks such as the public Internet, or a company network.

Message 104 is a message that is sent using, in part, one or more queues, such as primary queue 110 or retry queue 120. Message 104 may be generated by any source, such as a message providing process, a message consuming process, a computing instance, applications, software components or modules, etc. Message 104 may be formatted in any manner, and may contain any type or amount of data. Message 104 may contain multiple parts, such as a data portion and a header portion or other metadata. Message 104 may be part of an ordered series of messages, or may be a complete, standalone message.

Primary queue 110 is a FIFO messaging queue used by message consuming process 130 to receive messages from a message providing process, computing instance, applications, software components or modules, etc. Primary queue 110 may be part of a messaging service that is a distributed service hosted by a third party entity. Users of primary queue 110 may be customers of the third party entity. Alternatively, primary queue 110 may be hosted by the same entity that owns or operates message consuming process 130 or any other entity. The messages sent by primary queue 110 may be serialized, having a set order in which they should be sent or used.

Retry queue 120 is a FIFO messaging queue used by message consuming process 130 to retry messages previously received from primary queue 110 that were unable to be processed. Retry queue 120 may be part of a messaging service that is a distributed service hosted by a third party entity. Users of retry queue 120 may be customers of the third party entity. Alternatively, retry queue 120 may be hosted by the same entity that owns or operates message consuming process 130, the same entity that owns or operates primary queue 110, or any other entity. The messages sent by retry queue 120 may be serialized, having a set order in which they should be sent or used.

Queue control instructions 135 are programmed or configured to control primary queue 110 and/or retry queue 120. Queue control instructions 135 are programmed or configured to allow queues to receive and store any amount of messages or other data in any format. Further, queue control instructions 135 allow messages or other data to be received from any suitable source such as message consuming processes, message providing processes, computing devices or instances, applications, software components or modules, etc. Likewise, queue control instructions 135 allow message to be sent from a queue in response to a request, based on a number of messages received or present in the queue, time, or based on any other factor. Messages may be sent in any manner.

Queue control instructions 135 are programmed or configured to provide queues with sequential message delivery with a limit on the number of messages that may be held in the queues for processing at any given moment. The limit on such queued messages may be set to any amount by any entity, such as an administrator, user, programmer, etc. Queue control instructions 135 are programmed or configured to remove a message from a queue in response to an acknowledgment received from a recipient of a message, such as a message consuming process. When a message is removed from a queue, another message may subsequently be sent, as the removed message is no longer subject to queue processing. Queue control instructions 135 are programmed or configured to allow queues to accept acknowledgments only in the order the messages were sent. Alternatively, acknowledgments may be accepted out of order. Queue control instructions 135 are programmed or configured to delay sending of a message. A message may be delayed based on an instruction or request from a message consuming process, all messages for a given queue may be delayed a predetermined amount, or may be delayed based on any other suitable factor.

Message consuming process 130 is a process that consumes messages from one or more queues, such as primary queue 110 or retry queue 120. Message consuming process 130 is programmed or configured to request or obtain messages from primary queue 110 or retry queue 120 as needed. Alternatively, messages may be provided to message consuming process 130 without requiring a request. Message consuming process 130 is programmed or configured to process received messages. The obtained messages may be processed in any manner. When processing a message, the processing may be successful or unsuccessful. When processing is successful, message consuming process 130 is programmed or configured to send the queue that sent the message, whether primary queue 130 or retry queue 120, an acknowledgement, indicating that the message was successfully processed and that the message may be removed from the queue.

When processing is unsuccessful, message consuming process 130 is also programmed or configured to send the queue that sent the message an acknowledgement, indicating that the message was successfully processed and that the message may be removed from the queue, even though the processing was unsuccessful. And, message consuming process 130 is further programmed or configured to send the unsuccessfully processed message to retry queue 120. Thus, the sending queue, whether primary queue 110 or retry queue 120, receives an acknowledgement and is able to remove the message from the queue and send a new message, if a new message is available, thereby not slowing down the sending of messages despite the failure. However, message consuming process 130 will be able to attempt to reprocess the message at a later point in time because the message was forwarded to retry queue 120. Optionally, a timestamp or other method to track message age may be included with any messages sent to retry queue 120, so that message consuming process 130 may track the age of messages from retry queue 120.

Message consuming process 130 is programmed or configured to determine whether an age of a message satisfies a threshold when the message is received from retry queue 120. The age may come from a timestamp or other time indicator in the message, which may have been added by message consuming process 130 when forwarding the message to retry queue 120. The threshold may be set to any amount of time by any entity. If the threshold is exceeded, message consuming process 130 will process the message. If the threshold is not exceeded, message consuming process 130 will not process the message, and an acknowledgement and the message is again forwarded to retry queue 120 so that reprocessing may be attempted once the age of the message satisfies the threshold.

3. Example Functional Implementation

Figure 2:
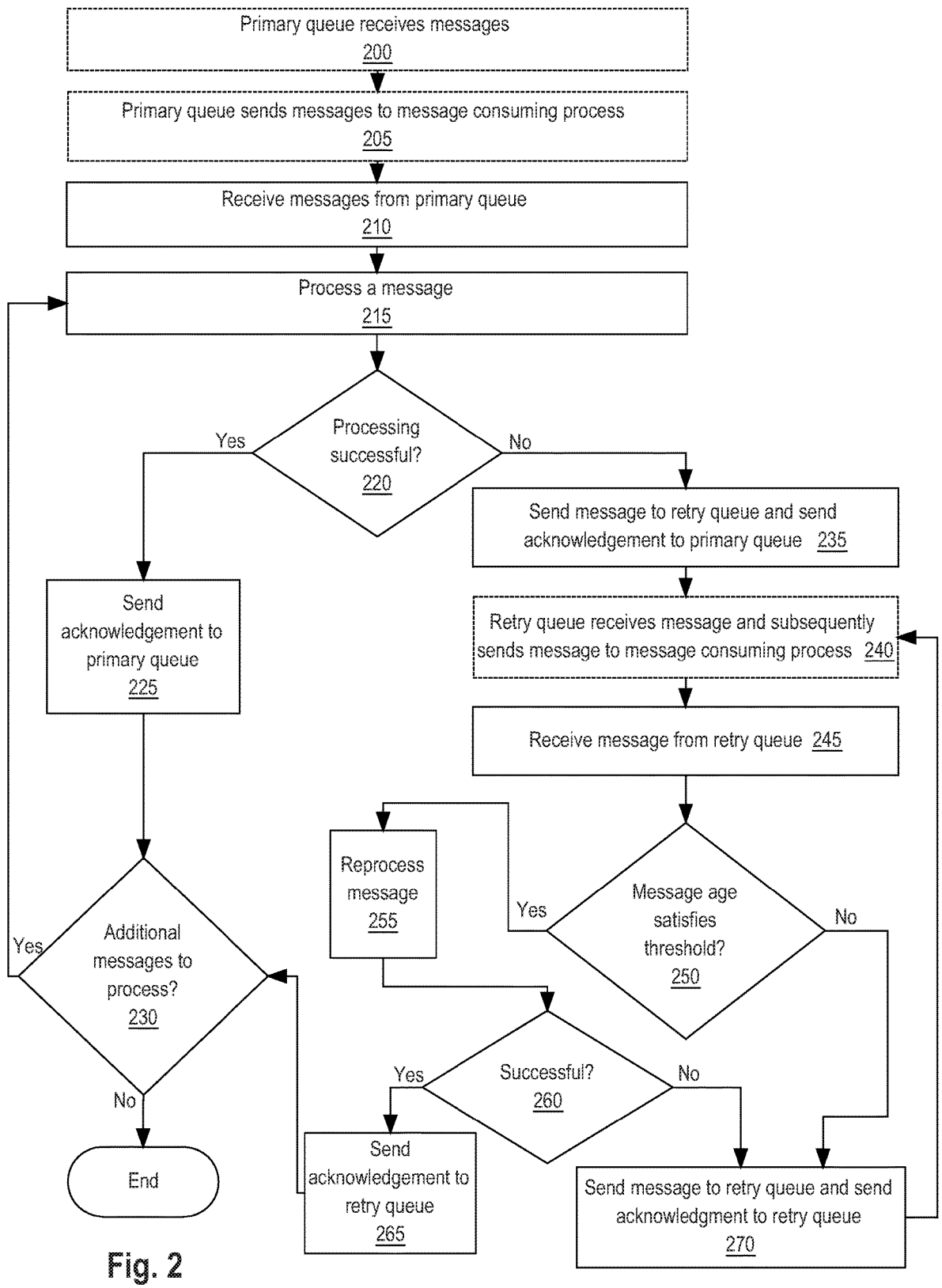
FIG. 2 illustrates a programmable algorithm or method for retry handling in messaging queues in accordance with an embodiment.

FIG. 2 illustrates an example programmable algorithm or method for retry handling in messaging queues. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 200, the primary queue receives messages. As indicated by the dotted lines, step 200 occurs at the primary queue. The primary queue may receive any amount of messages, at any time. The messages may be received continuously, or may be received at sporadic intervals. The messages may be of any size, any format, and may contain any data. The messages may be received or obtained from any source, such as a message producing process, computing devices, application, software components or modules, etc. As the messages are received, the primary queue adds the received messages to the queue in FIFO order.

In step 205, the primary queue sends messages to a message consuming process. As indicated by the dotted lines, step 205 occurs at the primary queue. The primary queue may send any number of messages to the message consuming process. There may be a limit to the number of messages that can be held in the queues in transit to the message consuming process. A message is in transit from the moment that the message was sent by the primary queue until the primary queue receives an acknowledgement from the message consuming process that the message was received successfully. The limit may be any amount, and may be set by any entity, such as an administrator, programmer, or user. The messages may be sent using any method and in any format. Due to the FIFO nature of the primary queue, the messages are sent in the order that they were received by the primary queue. Messages may be sent at any time, even while other steps of the method are being performed.

In step 210, messages are received or obtained from the primary queue. The messages are obtained by a message consuming process. Once received, the messages may be briefly stored prior to processing. Step 210 may be continuous. In other words, messages may be received from the primary queue at any time, even while other steps are being performed. The messages may be received or obtained in response to a request for messages from the message consuming process. Alternatively, the messages may be received or obtained without a request, such as the primary queue automatically sending messages when the messages are obtained by the primary queue.

In step 215, a message is processed. The messages may be processed in any manner. In one embodiment, the messages must be processed in the same order that the messages were sent by the primary queue. Alternatively, the messages may be processed in a different order. Processing a message may be successful or unsuccessful. Unsuccessful processing may result from network or transmission errors, or other errors.

In step 220, a determination is made whether processing was successful. If processing was not successful, the method proceeds to step 235. If processing was successful, the method proceeds to step 225.

In step 225, an acknowledgment is sent to the primary queue. The acknowledgment indicates that the associated message was received and successfully processed and, as a result, the primary queue may remove the associated message from its queue and, if another message is available, a new message may be sent to the message consuming process. The acknowledgment may be in any format and may contain any data. The acknowledgement may be sent in any manner.

In step 230, a determination is made whether there are additional messages to process. The determination may be made based on any factors, such as whether the message consuming process has unprocessed message in temporary storage. If there are no additional messages to process, the method ends. If there are additional messages to process, the method returns to step 215.

In step 235, the message is sent to the retry queue and an acknowledgement is sent to the primary queue. The message may be sent to the retry queue in any manner. Additional data may be added to the message when sent to the retry queue, such as a timestamp or other metadata. By sending the message to the retry queue, the message consuming process is able to continue processing other messages received from the primary queue because the message consuming process will subsequently be able to attempt reprocessing of the message once the message is sent back from the retry queue. In order to continue receiving messages, an acknowledgement is also sent to the primary in addition to sending the message to the retry queue. The acknowledgement is the same as discussed in step 225, even though processing was unsuccessful. Thus, the primary queue is unaware that the processing was unsuccessful, and proceeds as though processing was successful.

In step 240, the retry queue receives the message and subsequently sends the message back to the message consuming process. As indicated by the dotted lines, step 240 occurs at the retry queue. The retry queue may receive the message in any format using any method, and the message may contain additional data, such as metadata, added by the message consuming process. Alternatively, the message may not contain any additional data. The retry queue may wait a predetermined amount of time before sending the message back to the message consuming process. The predetermined amount of time may be any amount of time. Alternatively, the retry queue may wait to receive a request from the message consuming process, or may send the message back to the message consuming process based on any other factor.

Simultaneously, while step 235, 240, and 245 are occurring, the message consuming process may receive additional messages from the primary queue and process the received messages. In other words, message consuming process does not need to stop and wait for a chance to reprocess unsuccessfully processed messages. Rather, the message consuming process may continue consuming messages from the primary queue without having to wait, and can attempt reprocessing of a message in the retry queue after a suitable amount of time has passed.

In step 245, the message is received or obtained from the retry queue. The messages are received by the message consuming process. Once received, the messages may be briefly stored prior to processing. The message may be received from the retry queue at any time, even while other steps are being performed, and may be received in any format using any method of communication.

In step 250, a determination is made whether the message satisfies an age threshold. If the age threshold is not satisfied, the method proceeds to step 270. If the age threshold is satisfied, the method proceeds to step 255. The age threshold may be set to any amount, by any entity such as an administrator, programmer, or user. Alternatively, there may be no age threshold set, and therefore no determination performed.

In step 255, the message is reprocessed. The message may be reprocessed in any manner. Reprocessing a message may be successful or unsuccessful. Unsuccessful reprocessing may result from network or transmission errors, or other errors.

In step 260, a determination is made whether the reprocessing was successful. If the reprocessing was not successful, the method proceeds to step 270. If the reprocessing was successful, the method proceeds to step 265.

In step 265, an acknowledgment is sent to the retry queue. The acknowledgment indicates that the associated message was received and successfully processed and, as a result, the retry queue may remove the associated message from its queue and, if another message is available, a new message may be sent to the message consuming process. The acknowledgment may be in any format and may contain any data. The acknowledgement may be sent in any manner.

In step 270, the message is sent to the retry queue and an acknowledgment is sent to the retry queue. The message may be resent to the retry queue in any manner. Additional data may be added to the message when resent to the retry queue, such as a timestamp or other metadata. By resending the message to the retry queue, the message consuming process is able to continue processing other messages received from the primary queue or retry queue because the message consuming process will subsequently be able to attempt reprocessing of the message once the message is sent back from the retry queue. In order to continue receiving messages, an acknowledgement is also sent to the retry in addition to resending the message to the retry queue. The acknowledgement is the same as discussed in step 225, even though processing was unsuccessful. Thus, the retry queue is unaware that the processing was unsuccessful, and proceeds as though processing was successful.

Using this process, a message bus system or message queueing service may provide a robust reprocessing or retry capabilities without unnecessary overhead. In particular, the invention provides consistency and durability of the ACID (Atomicity, Consistency, Isolation, and Durability) properties. By reducing the overhead associated with conventional reprocessing or retry capabilities, the effectiveness and usability of message bus systems or message queuing services is increased. The techniques herein can permit processing data with fewer CPU cycles and less memory needed. Further, the techniques herein allow for reprocessing or retry capabilities to be implemented in part using existing components.

4. Example Retry Handling in Messaging Queues

Figure 3:
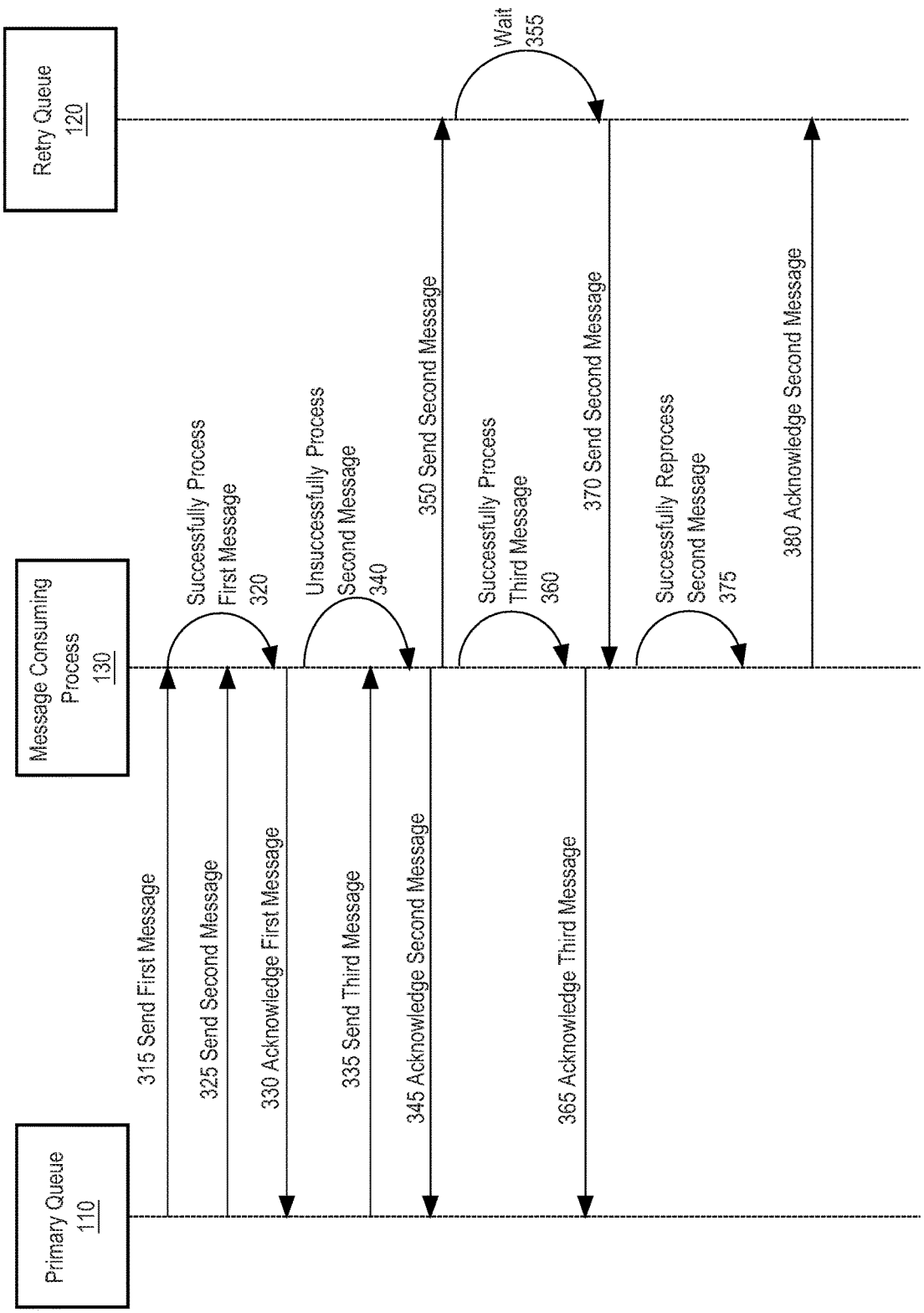
FIG. 3 illustrates an example of retry handling in messaging queues.

FIG. 3 illustrates an example of retry handling in messaging queues in accordance with an embodiment.

In FIG. 3, primary queue 110, message consuming process 130, and retry queue 120 are shown. Prior to the example in FIG. 3 beginning, primary queue 110 receives messages from a source, and stores them in FIFO order. For the purposes of this example, there is a limit of two messages in process or in transit between primary queue 110 and message consuming process 130, and primary queue 110 has three messages to send to message consuming process 130.

In response to the queue being full, a request from message consuming process 130, or any other factor, primary queue 110 sends a first message 315 to message consuming process 130. Message consuming process 130 receives the first message, and then begins to process the first message. Meanwhile, primary queue 110 sends a second message 325 to message consuming process 130. This second message is the maximum number of messages allowed to be held in the queues and/or in transit to a consuming process, and primary queue 110 is unable to send another message until an acknowledgement of the first message is received from message consuming process 130. Message consuming process 130 receives the second message, and temporarily stores the second message until processing of the first message is completed.

Once processing of the first message is successfully completed 320, message consuming process 130 acknowledges the first message 330 to primary queue 110, and begins processing the second message. Meanwhile, primary queue 110 receives the acknowledgement of the first message, removes the first message from the queue, and sends a third message 335 to message consuming process 130. At this point, message consuming process 130 has unsuccessfully processed the second message 340. Rather than attempting to reprocess or giving up altogether, message consuming process 130 acknowledges the second message 345 to primary queue 110 and sends the second message 350 to retry queue 120. Thus, to primary queue 110 it appears that message consuming process 130 has completed the processing of the second message. Accordingly, primary queue 110 removes the second message from the queue and, if there were additional messages in the queue, a next message would be sent to message consuming process 130. However, as discussed above, primary queue 110 has only three messages to send in this example, and thus no additional message is sent in response to the acknowledgement of the second message.

When retry queue 120 receives the second message, the second message is placed in the queue in FIFO order. Retry queue then waits 355 for a predetermined amount of time. Meanwhile, message consuming process has moved on to processing the third message. Once the third message is successfully processed 360, message consuming process 130 acknowledges the third message 365 to primary queue 110, and primary queue 110 removes the third message from the queue. At this point in the example, the predetermined amount of time for retry queue 120 to wait 355 has passed and, accordingly, retry queue 120 sends the second message 370 back to message consuming process 130, which allows message consuming process 130 to attempt to reprocess the second message. Fortunately, reprocessing is successful 375, and thus message consuming process 130 send an acknowledgement for the second message to retry queue 120. When retry queue 120 receives the acknowledgement, retry queue 120 removes the second message from the queue.

Thus, a message bus system or message queueing service may provide robust reprocessing or retry capabilities without unnecessary overhead and without slowing down the overall system while waiting on reprocessing. Further, by reducing the overhead associated with reprocessing or retry capabilities, the effectiveness and usability of message bus systems or message queuing services is increased. The techniques herein can permit processing data with fewer CPU cycles and less memory needed. Further, the techniques herein allow for reprocessing or retry capabilities to be implemented in part using unmodified existing components.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 4:
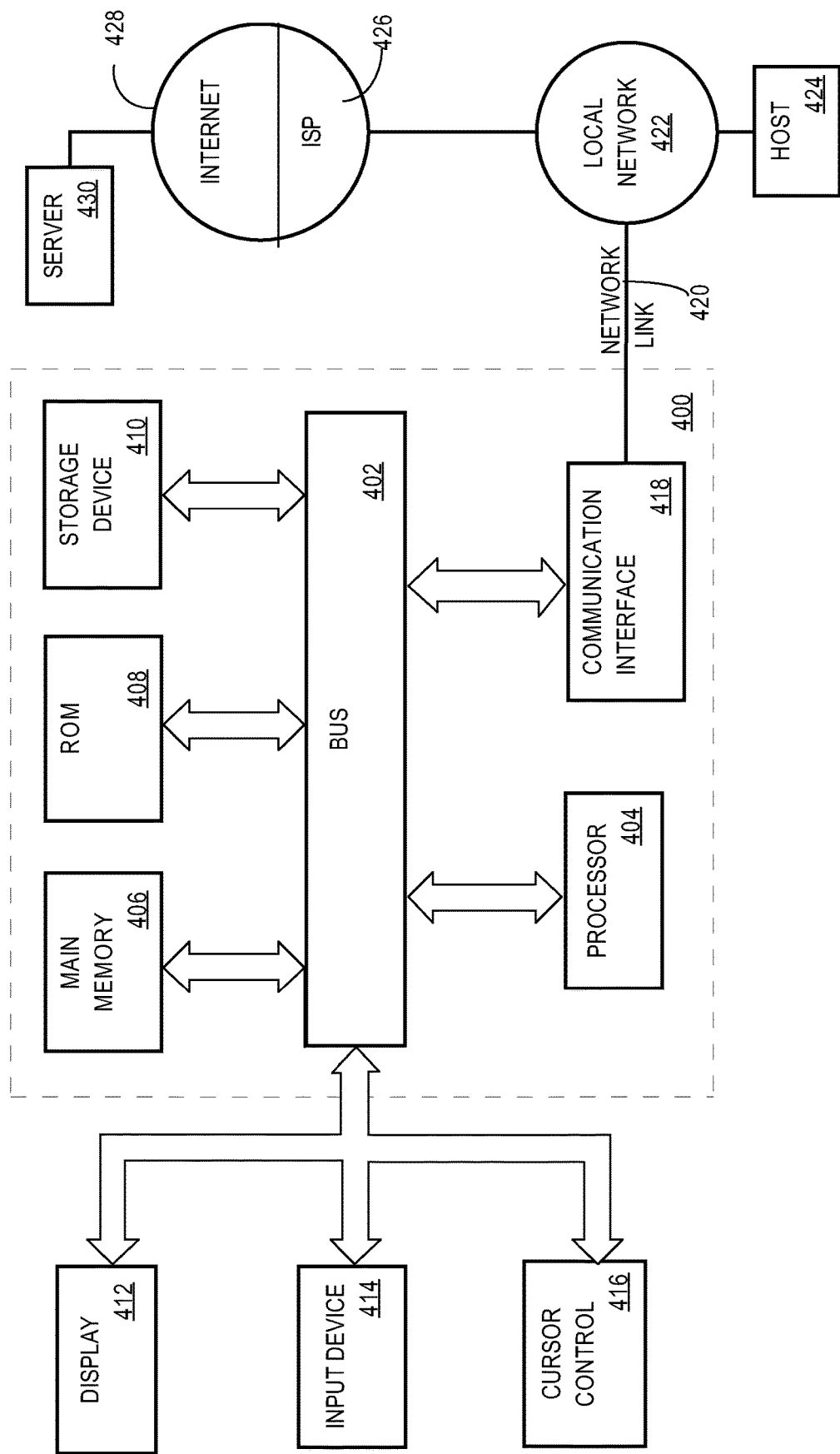
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hardwired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and stored in storage device 410, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
receiving a plurality of digital data messages in a first-in first-out (FIFO) primary queue of an electronic digital memory that is coupled to a message consuming process that is executed using computer instructions that are programmed to serially obtain messages from the primary queue and to process the messages;
determining that processing a first message of the plurality of messages has failed;
in response to determining that processing the first message failed, using the message consuming process, sending a first acknowledgement to the primary queue, the first acknowledgement indicative that processing the first message was successful, sending the first message to a retry queue that is different from the primary queue, and processing one or more other messages from the primary queue;
obtaining the first message from the retry queue;
reprocessing the first message;
repeating periodically selecting and processing one or more other messages from the primary queue and periodically selecting and processing one or more different other messages from the retry queue.

2. The method of claim 1, further comprising:
obtaining a message age value that is associated with the first message as part of obtaining the first message from the retry queue;
performing the reprocessing the of the first message from the retry queue only when the message age value satisfies a threshold.

3. The method of claim 2, further comprising:
in response to determining that the message age value fails to satisfy the threshold, sending the first message to the retry queue and sending a second acknowledgement to the retry queue.

4. The method of claim 1, further comprising:
in response to reprocessing the first message from the retry queue failing, sending the first message to the retry queue and sending a third acknowledgement to the retry queue.

5. The method of claim 1, further comprising:
in response to determining that reprocessing the first message succeeded, sending a fourth acknowledgement to the retry queue.

6. The method of claim 1, wherein the first acknowledgement causes the primary queue to remove the first message from the primary queue and send a new message to the message consuming process.

7. The method of claim 1, wherein the plurality of messages are processed sequentially.

8. A computer system comprising:
a computing instance comprising one or more processors and one or more memories storing one or more sequences of instructions for a message consuming process which, when executed by the one or more processors, cause the one or more processors to perform:
obtaining digital data messages from a primary queue and processing the digital data messages, wherein the primary queue is a first-in first-out (FIFO) queue of an electronic digital memory that is coupled to the message consuming process;
determining that processing a first message of the digital data messages has failed;
in response to determining that processing the first message failed, using the message consuming process, sending a first acknowledgement to the primary queue, the first acknowledgement indicative that processing the first message was successful, sending the first message to a retry queue that is different from the primary queue, and processing one or more other messages from the primary queue;
obtaining the first message from the retry queue;
reprocessing the first message;
repeating periodically selecting and processing one or more other messages from the primary queue and periodically selecting and processing one or more different other messages from the retry queue.

9. The system of claim 8, further comprising:
obtaining a message age value that is associated with the first message as part of obtaining the first message from the retry queue;
performing the reprocessing the of the first message from the retry queue only when the message age satisfies a threshold.

10. The system of claim 9, further comprising:
in response to determining that the message age value fails to satisfy the threshold, sending the first message to the retry queue and sending a second acknowledgement to the retry queue.

11. The system of claim 8, further comprising:
in response to reprocessing the first message from the retry queue failing, sending the first message to the retry queue and sending a third acknowledgement to the retry queue.

12. The system of claim 8, further comprising:
in response to determining that reprocessing the first message succeeded, sending a fourth acknowledgement to the retry queue.

13. The system of claim 8, wherein the first acknowledgement causes the primary queue to remove the first message from the primary queue and send a new message to the message consuming process.

14. The system of claim 8, wherein the plurality of messages are processed sequentially.

15. One or more non-transitory computer readable media storing one or more sequences of instructions for a message consuming process which, when executed, cause:
obtaining digital data messages from a primary queue and to processing the digital data messages, wherein the primary queue is a first-in first-out (FIFO) queue of an electronic digital memory that is coupled to the message consuming process;
determining that processing a first message of the digital data messages has failed;
in response to determining that processing the first message failed, using the message consuming process, sending a first acknowledgement to the primary queue, the first acknowledgement indicative that processing the first message was successful, sending the first message to a retry queue that is different from the primary queue, and processing one or more other messages from the primary queue;
obtaining the first message from the retry queue;
reprocessing the first message;
repeating periodically selecting and processing one or more other messages from the primary queue and periodically selecting and processing one or more different other messages from the retry queue.

16. The one or more computer readable media of claim 15, wherein the one or more sequences of instructions, when executed, further cause:
obtaining a message age value that is associated with the first message as part of obtaining the first message from the retry queue;
performing the reprocessing the of the first message from the retry queue only when the message age satisfies a threshold.

17. The one or more computer readable media of claim 16, wherein the one or more sequences of instructions, when executed, further cause:
in response to determining that the message age value fails to satisfy the threshold, sending the first message to the retry queue and sending a second acknowledgement to the retry queue.

18. The one or more computer readable media of claim 15, wherein the one or more sequences of instructions, when executed, further cause:
in response to reprocessing the first message from the retry queue failing, sending the first message to the retry queue and sending a third acknowledgement to the retry queue.

19. The one or more computer readable media of claim 15, wherein the one or more sequences of instructions, when executed, further cause:
in response to determining that reprocessing the first message succeeded, sending a fourth acknowledgement to the retry queue.

20. The one or more computer readable media of claim 15, wherein the first acknowledgement causes the primary queue to remove the first message from the primary queue and send a new message to the message consuming process.

* * * * *